(12) United States Patent
Liu et al.

(10) Patent No.: US 12,068,590 B2
(45) Date of Patent: Aug. 20, 2024

(54) WIRING DEVICE FOR CIRCUIT BREAKER, AND CIRCUIT BREAKER HAVING SAME

(71) Applicant: YUEQING GAOKE ENVIRONMENTAL ELECTRIC CO., LTD, Wenzhou (CN)

(72) Inventors: Xiangrong Liu, Wenzhou (CN); Jing Li, Wenzhou (CN)

(73) Assignee: YUEQING GAOKE ENVIRONMENTAL ELECTRIC CO., LTD, Wenzhou (CN)

( * ) Notice: Subject to any disclaimer, the term of this patent is extended or adjusted under 35 U.S.C. 154(b) by 0 days.

(21) Appl. No.: 17/909,246

(22) PCT Filed: Aug. 31, 2020

(86) PCT No.: PCT/CN2020/112385
§ 371 (c)(1),
(2) Date: Sep. 2, 2022

(87) PCT Pub. No.: WO2022/000752
PCT Pub. Date: Jan. 6, 2022

(65) Prior Publication Data
US 2023/0087191 A1 Mar. 23, 2023

(30) Foreign Application Priority Data

Jul. 2, 2020 (CN) .......................... 202010633826.7
Aug. 17, 2020 (CN) .......................... 202010827186.3

(51) Int. Cl.
*H02G 5/02* (2006.01)
*H01H 9/02* (2006.01)
*H02G 3/04* (2006.01)

(52) U.S. Cl.
CPC ............ *H02G 3/0456* (2013.01); *H01H 9/02* (2013.01); *H02G 5/02* (2013.01)

(58) Field of Classification Search
CPC ....................................................... H02G 5/007
(Continued)

(56) References Cited

U.S. PATENT DOCUMENTS

2015/0248987 A1  9/2015  Lu et al.

FOREIGN PATENT DOCUMENTS

| CN | 205666197 U | 10/2016 |
| CN | 205992517 U | 3/2017 |

(Continued)

OTHER PUBLICATIONS

China National Intellectual Property Admininstration, PCT International Search Report and Written Opinion, Application No. PCT/CN2020/112385, dated Mar. 26, 2021, 17 pages.
(Continued)

*Primary Examiner* — Chau N Nguyen
(74) *Attorney, Agent, or Firm* — Mahamedi IP Law LLP

(57) ABSTRACT

Disclosed are a wiring device for a circuit breaker and a circuit breaker having same. The wiring device comprises: a wire holder having a plurality of busbar slots distributed in the height direction; a plurality of wiring busbars correspondingly inserted into the plurality of busbar slots, the wiring busbars being provided with first busbar parts which are vertically arranged; a plurality of first conductive elements arranged on the wire holder at intervals in the width direction, the first conductive elements being provided with first connecting plates which are arranged in the vertical direction; and a first fastening structure which is used for fixedly connecting the first busbar parts and the first connecting plates. Since the plurality of first connecting plates are vertically arranged in the width direction in a staggered manner, the plurality of first busbar parts arranged in the height direction can be directly connected to the corresponding first connecting plates, such that the structure is simpler;

(Continued)

the first busbar part and the first connecting plate of each layer are vertically arranged, such that the length of the wiring device for a circuit breaker is greatly reduced, and compared with the prior art, the wiring device for a circuit breaker is more miniaturized; and in addition, due to a small amount of copper materials being used, the temperature rise of the wiring device for a circuit breaker is not only lower, but the cost is also lower.

14 Claims, 15 Drawing Sheets

(58) Field of Classification Search
USPC .......................... 174/70 B, 72 B, 88 B, 99 B
See application file for complete search history.

(56) References Cited

FOREIGN PATENT DOCUMENTS

| CN | 108288569 A | | 7/2018 |
|----|-------------|---|--------|
| CN | 210325662 U | | 4/2020 |
| CN | 212461566 U | | 2/2021 |
| JP | 2000-188805 | * | 7/2000 |
| JP | 4979481 | * | 4/2012 |
| JP | 3204423 | * | 5/2016 |
| JP | 2016-158441 | * | 9/2016 |

OTHER PUBLICATIONS

Eurasian Patent Office, Office Action, EAPO Application No. 202292595, mailed Jan. 11, 2023, 2 pages.

* cited by examiner though the first through hole, the second through hole, the third through hole and the first threaded hole in sequence to fixedly connect the first busbar part, the second conductive element, the first connecting plate and the fixing plate.

WIRING DEVICE FOR CIRCUIT BREAKER, AND CIRCUIT BREAKER HAVING SAME

CROSS REFERENCE TO RELATED APPLICATIONS

This application claims the priority of Chinese Patent Application No. 2020106338267, filed on Jul. 2, 2020 and entitled "Wiring Device for Circuit Breaker" and the priority of Chinese Patent Application No. 2020108271863, filed on Aug. 17, 2020 and entitled "Wiring Device for Circuit Breaker and Circuit Breaker Having Same", the contents of which are incorporated herein by reference.

TECHNICAL FIELD

The present application relates to the technical field of a connection device for a power distribution apparatus, and particularly relates to a wiring device for a circuit breaker, and a circuit breaker having same.

BACKGROUND

When an existing circuit breaker is connected to a power supply, a copper bar or a busbar is usually used for connection. When a copper bar is used for connection, as shown in FIG. 15, the copper bar has a first copper bar 01 that can be connected to a wiring terminal of a circuit breaker, and a second copper bar 02 that is vertically connected to the first copper bar 01. A joint between the first copper bar 01 and the second copper bar 02 needs to be perforated, and the first copper bar and the second copper bar are connected through a screw, which increases a temperature rise. In addition, considering a creepage distance between copper bars in different phases, the cost is increased, and the temperature rise is also increased. Using a busbar for connection also faces the above same problems. In addition, a busbar needs to be customized in a factory, so that the cost is high.

In order to solve the above-mentioned technical problems, the Chinese patent document CN210325662U previously applied by this applicant discloses a power connection mechanism and a molded case circuit breaker. The power connection mechanism includes a first mounting seat and a plurality of conductive assemblies. Each conductive assembly includes a bracket, a clamping member rotatably mounted on the bracket, and a driving structure; the clamping member is provided with a first rotating arm and a second rotating arm which are distributed on two sides of the rotating shaft; the driving structure is arranged on one side of the first rotating arm; and the second rotating arm is opposite to the bracket to form a wire clamping slot for clamping a wiring copper bar. During wiring, a flat wiring copper bar is inserted into the wire clamping slot, and then the first rotating arm is driven to rotate through the driving structure to clamp the wiring copper bar. Due to the longer conductive assemblies, on the one hand, the length of the power connection mechanism is increased, which cannot meet the need of product miniaturization; and on the other hand, the temperature rise of a product is increased. In addition, the structures of the conductive assemblies are relatively complex, which increases the production cost.

SUMMARY

Therefore, the technical problem to be solved in the present application is to overcome the defects that a power connection mechanism in the prior art is longer in length, cannot satisfy product miniaturization and has the defects of large temperature rise and high cost, thus providing a miniaturized wiring device for a circuit breaker, which has small temperature rise and low cost, and a circuit breaker having the wiring device.

To this end, the present application provides a wiring device for a circuit breaker. The wiring device includes: a wire holder, a plurality of wiring busbars, a plurality of first conductive elements and a first fastening structure, wherein the wire holder is arranged on a circuit breaker body and is provided with a plurality of busbar slots distributed in a height direction; the plurality of wiring busbars are correspondingly inserted into the plurality of busbar slots, and are provided with first busbar parts that are vertically arranged; the plurality of first conductive elements are arranged on the wire holder at intervals in a width direction, and are provided with first connecting plates that are vertically arranged; and the first fastening structure is used for fixedly connecting the first busbar part to the first connecting plate.

The first conductive elements are provided with second connecting plates which are connected to bottoms of the first connecting plates in an integrally bent manner and are electrically connected to a control circuit inside the circuit breaker body; and the plurality of second connecting plates all extend towards the same side.

The plurality of second connecting plates are all located on the same horizontal plane.

The wiring device for the circuit breaker further includes a second conductive element arranged between the corresponding first busbar part and first connecting plate; and the second conductive element is suitable for staggering the corresponding wiring busbar from the remaining non-corresponding first conductive elements.

The plurality of first busbar parts are all arranged on a first vertical plane; the plurality of second conductive elements are all arranged on a second vertical plane; and the plurality of first connecting plates are all arranged on a third vertical plane.

The plurality of first connecting plates are all arranged upwards or downwards.

A part of the first connecting plates are arranged downwards, and the other part of the first connecting plates are arranged upwards.

The wiring busbar is provided with a second busbar part perpendicular to the first busbar part.

The second conductive element is integrally formed on the first busbar part or the first connecting plate.

The first fastening structure is suitable for fixedly connecting the first busbar part, the second conductive element and the first connecting plate, and the first fastening structure includes: a first through hole which is formed in the first busbar part; a second through hole which is formed in the second conductive element and is opposite to the first through hole; a third through hole which is formed in the first connecting plate and is opposite to the second through hole; a first threaded hole which is formed in a fixing plate and is opposite to the third through hole; and a first bolt which passes through the first through hole, the second through hole, the third through hole and the first threaded hole in sequence to fixedly connect the first busbar part, the second conductive element, the first connecting plate and the fixing plate.

The wire holder is provided with a mounting hole used for mounting the second conductive element, a first passage used for mounting the first connecting plate, and a mounting slot used for mounting the fixing plate in sequence in an insertion direction of the first bolt.

The second conductive element, the first connecting plate and the fixing plate are fixedly connected through a second fastening structure; the second fastening structure includes a fourth through hole which is formed in the second conductive element; a fifth through hole which is formed in the first connecting plate and is opposite to the fourth through hole; a second threaded hole which is formed in the fixing plate and is opposite to the fifth through hole; and a second bolt which passes through the fourth through hole and the fifth through hole in sequence to be in threaded connection with the second threaded hole.

A second passage for communicating the outside to the second connecting plate is arranged between the wire holder and the circuit breaker body.

The wire holder is integrally formed on the circuit breaker body.

The wire holder and the circuit breaker body are arranged separately.

The present application further provides a circuit breaker, including a circuit breaker body, and the above-mentioned wiring device for the circuit breaker.

The technical solution of the present application has the following advantages:

1. The wiring device for the circuit breaker provided by the present application includes the wire holder, the wiring busbars, the first conductive elements and the first fastening structure; the wiring busbars are provided with the first busbar parts that are vertically arranged; the plurality of first conductive elements are arranged on the wire holder at intervals in the width direction; and the first conductive elements are provided with the first connecting plates that are vertically arranged. Since the plurality of first connecting plates are vertically arranged in the width direction in a staggered manner, the plurality of first busbar parts arranged in the height direction can be directly connected to the corresponding first connecting plates, which makes the structure simpler; the first busbar part and the first connecting plate of each layer are vertically arranged, such that the length of the wiring device for the circuit breaker is greatly reduced. Compared with the prior art that the busbar is fixed by a bracket, a clamping member, and a driving structure, the wiring device for the circuit breaker is more miniaturized; and in addition, due to the use of a small amount of copper, the wiring device for the circuit breaker not only has a smaller temperature rise, but also is lower in cost, and also has the advantage of low energy consumption and more energy saving.

2. According to the wiring device for the circuit breaker provided by the present application, the first conductive elements are provided with the second connecting plates which are connected to the bottoms of the first connecting plates in an integrally bent manner and are electrically connected to the control circuit inside the circuit breaker body; and the plurality of second connecting plates are all located on the same horizontal plane, that is, the first conductive elements are arranged in an L shape, the structure is simple and the processing is convenient. In addition, since the plurality of second connecting plates are all located on the same horizontal plane, it is convenient for corresponding direct connection to the plurality of wiring terminals of the existing molded case circuit breaker or direct connection to the control circuit inside the circuit breaker body.

3. According to the wiring device for the circuit breaker provided by the present application, the second conductive elements are suitable for staggering the corresponding wiring busbars from the remaining non-corresponding first conductive elements, thereby avoiding short circuit formed by lap joint between the wiring busbars in different phases and the non-corresponding first conductive elements, and being safe and highly reliable.

4. According to the wiring device for the circuit breaker provided by the present application, the plurality of first busbar parts are all arranged on the first vertical plane; the plurality of second conductive elements are all arranged on the second vertical plane; and the plurality of first connecting plates are all arranged on the third vertical plane. In this way, the width of an assembly formed by the first busbar part, the second conductive element and the first connecting plate on each layer is the same, and left and right positions of the assembly of each layer are also the same, so that the overall length of the wiring device for the circuit breaker can be minimum.

5. According to the wiring device for the circuit breaker provided by the present application, a part of the first connecting plates are arranged downwards, and the other part of the first connecting plates are arranged upwards. In this way, the overall height of the plurality of first connecting plates can be smaller, that is, the copper consumption is also low, thereby saving more energy and achieving low energy consumption.

6. According to the wiring device for the circuit breaker provided by the present application, the wiring busbars are provided with the second busbar parts perpendicular to the first busbar parts, that is, the wiring busbars are L-shaped. Compared with the prior art that wiring busbars are flat, the present application has the advantage that a manufacturer can change the current-carrying capability by changing sectional areas of the L-shaped wiring busbars according to a requirement of a user for an appliance product with different current levels, so that the wiring device can adapt to the appliance product with different current levels. That is, when there is a low current, the first busbar parts that are vertically arranged are used only. When there is a high current, the L-shaped wiring busbars can be used. The L-shaped wiring busbars can also enlarge the heat dissipation area, so that the heat dissipation effect is better.

7. According to the wiring device for the circuit breaker provided by the present application, the wire holder is provided with the mounting hole used for mounting the second conductive element, the first passage used for mounting the first connecting plate, and the mounting slot used for mounting the fixing plate in sequence in the insertion direction of the first bolt, and the second conductive element, the first connecting plate and the fixing plate are fixedly connected through the second fastening structure. In this way, the second conductive element, the first connecting plate and the fixing plate are assembled before delivery, so that a customer can use the wiring device more convenient only by assembling the wiring busbars.

8. According to the wiring device for the circuit breaker provided by the present application, the second conductive elements are integrally formed on the first busbars or the first connecting plates, so that the structure is simpler and the assembly is convenient.

9. According to the wiring device for the circuit breaker provided by the present application, the second passage for communicating the outside to the second connecting plates is arranged between the wire holder and the circuit breaker body, which is conductive for heat dissipation of the first conductive elements, thus improving the safety and the reliability.

BRIEF DESCRIPTION OF THE DRAWINGS

To describe the specific implementation modes of the present application or the technical solutions in the prior art more clearly, drawings required to be used in the specific implementation modes or the description of the prior art will be briefly introduced below. Apparently, the drawings in the description below are some implementation modes of the present application. Those of ordinary skill in the art can also obtain other drawings according to these drawings without creative work.

Figure 1:
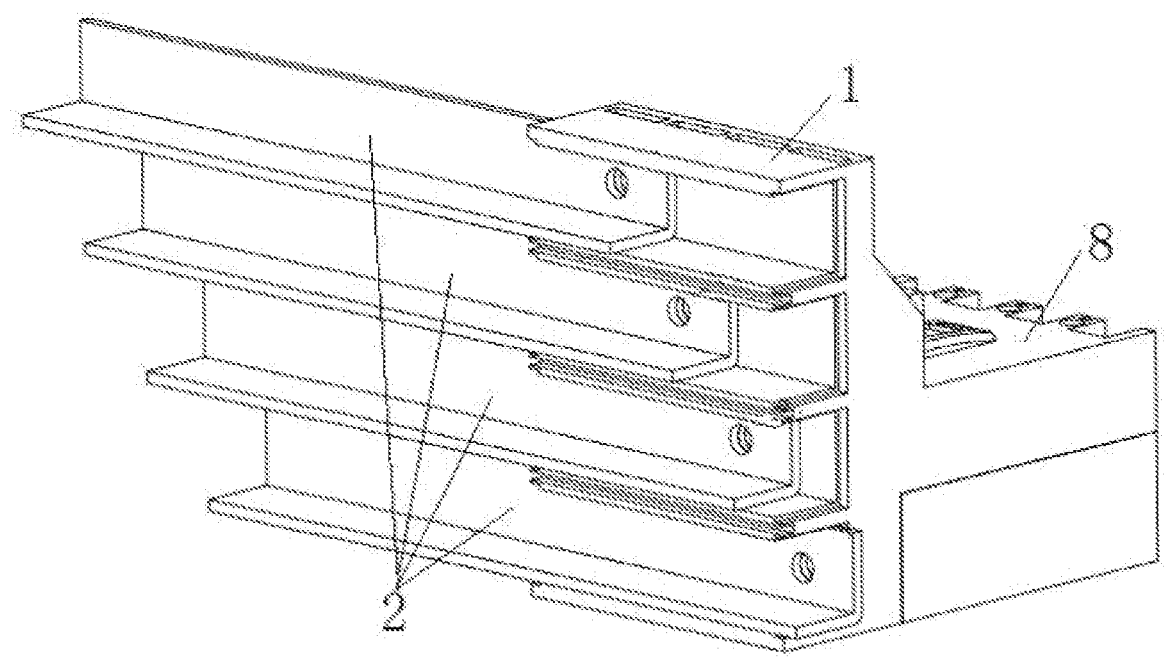
FIG. 1 is a three-dimensional diagram of a wiring device and a circuit breaker of the present application.

Reference numerals in the drawings: 01: first copper bar; 02: second copper bar;

1: wire holder; 11: busbar slot; 12: second passage; 2: wiring busbar; 21/21a: first busbar part; 22: second busbar part; 3: first conductive element; 31/31a/31b/31c/31d: first connecting plate; 32: second connecting plate; 4: second conductive element; 5: first fastening structure; 51: first through hole; 52: second through hole; 53: third through hole; 54: first threaded hole; 6: fixing plate; 7: second fastening structure; 71: fourth through hole; 72: fifth through hole; 73: second threaded hole; 8: circuit breaker body.

DETAILED DESCRIPTION

The technical solutions of the present application will be clearly and completely described below in conjunction with the drawings. Apparently, the described embodiments are only a part of the embodiments of the present application, instead of all the embodiments. Based on the embodiments in present application, all other embodiments obtained by those of ordinary skill in the art without creative work shall fall within the protection scope of the present application.

In the description of the present application, it should be noted that orientations or positional relationships indicated by the terms "center", "upper", "lower", "left", "right", "vertical", "horizontal", "inside", "outside", and the like are orientations or positional relationships as shown in the drawings, and are only for the purpose of facilitating and simplifying the description of the present application instead of indicating or implying that devices or elements indicated must have particular orientations, and be constructed and operated in the particular orientations, so that these terms are not understood as limiting the present application. In addition, the terms "first", "second" and "third" are only for the purpose of description, and may not be understood as indicating or implying the relative importance.

In the description of the present application, it should be also noted that unless otherwise explicitly defined and defined, the terms "mount", "couple" and "connect" should be understood broadly, and may be, for example, fixed connection, or detachable connection, or integral connection, or mechanical connection, or electrical connection, or direct connection, or indirect connection through an intermediate medium, or internal connection between two elements. For those of ordinary skill in the art, the specific meanings of the above-mentioned terms in the present application can be understood according to specific situations.

In addition, technical features involved in different implementation modes of the present application described below may be mutually combined as long as they do not constitute conflicts.

Embodiment

Figure 2:
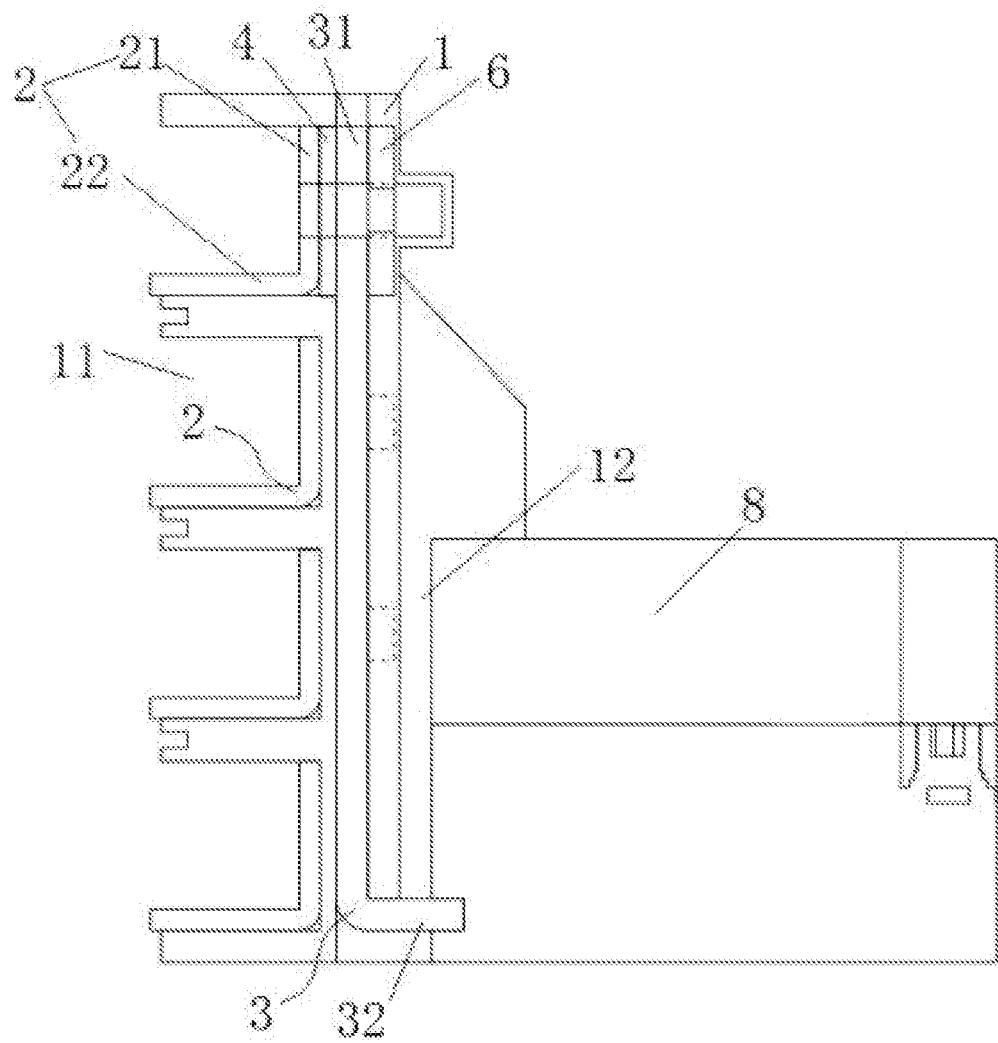
FIG. 2 is a sectional view of FIG. 1.

A circuit breaker provided by the embodiment, as shown in FIG. 1 and FIG. 2, includes a circuit breaker body 8, and a wiring device arranged on one side of the circuit breaker body 8. The wiring device for the circuit breaker includes a wire holder 1, wiring busbars 2, first conductive elements 3, second conductive elements 4, a first fastening structure 5 and a second fastening structure 7.

As shown in FIG. 2, the wire holder 1 is provided with four busbar slots 11 uniformly distributed in a height direction. The wire holder 1 is provided with a mounting hole used for mounting the second conductive element 4, a first passage used for mounting a first connecting plate 31, and a mounting slot used for mounting a fixing plate 6 in sequence from left to right; and a second passage 12 for communicating the outside to a second connecting plate 32 is arranged between the wire holder 1 and the circuit breaker body 8. In the embodiment, the wire holder 1 is integrally formed on the circuit breaker body 8.

There are four wiring busbars 2 which can be correspondingly inserted into corresponding busbar slots 11. The wiring busbars 2 are provided with first busbar parts 21 that are vertically arranged, and second busbar parts 22 perpendicular to the first busbar parts 21; the second busbar parts 22 prop against mounting plates at bottoms of the busbar slots 11. The four first busbar parts 21 are arranged on a first vertical plane. It should be noted that being on the same vertical plane means that the thicknesses of the four first busbar parts 21 are the same, and left and right side surfaces of each first busbar part 21 are correspondingly located at the same position.

There are four first conductive elements 3 which are uniformly arranged on the wire holder 1 in a width direction. The first conductive elements 3 are L-shaped, and are provided with first connecting plates 31 that are vertically arranged, and second connecting plates 32 that are connected to bottoms of the first connecting plates 31 in an integrally bent manner and are electrically connected to a control circuit inside the circuit breaker body 8. The four first connecting plates 31 are all arranged on a third vertical plane and arranged upwards. The four second connecting plates 32 all extend towards the same side and are all located on the same horizontal plane.

Figure 3:
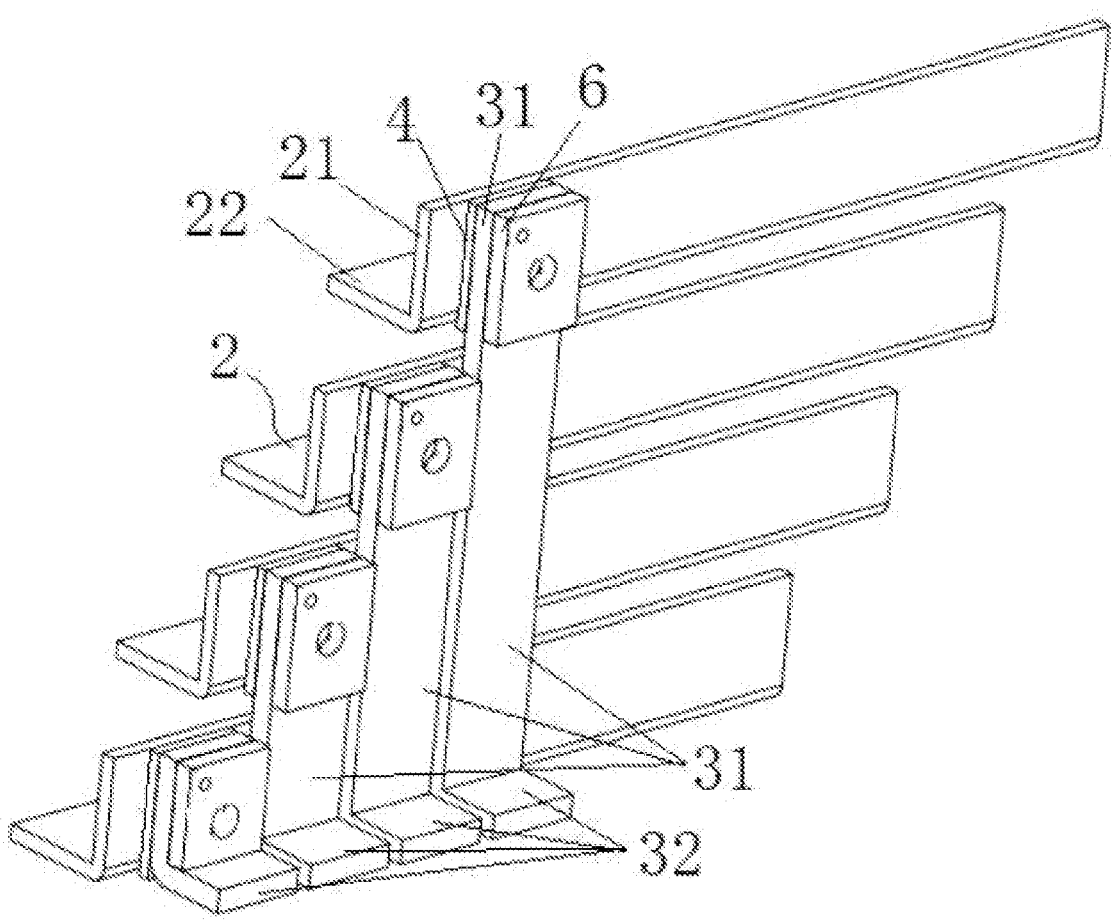
FIG. 3 is a three-dimensional diagram of the wiring device for the circuit breaker in FIG. 1 after a wire holder and a circuit breaker body are removed.
Figure 4:
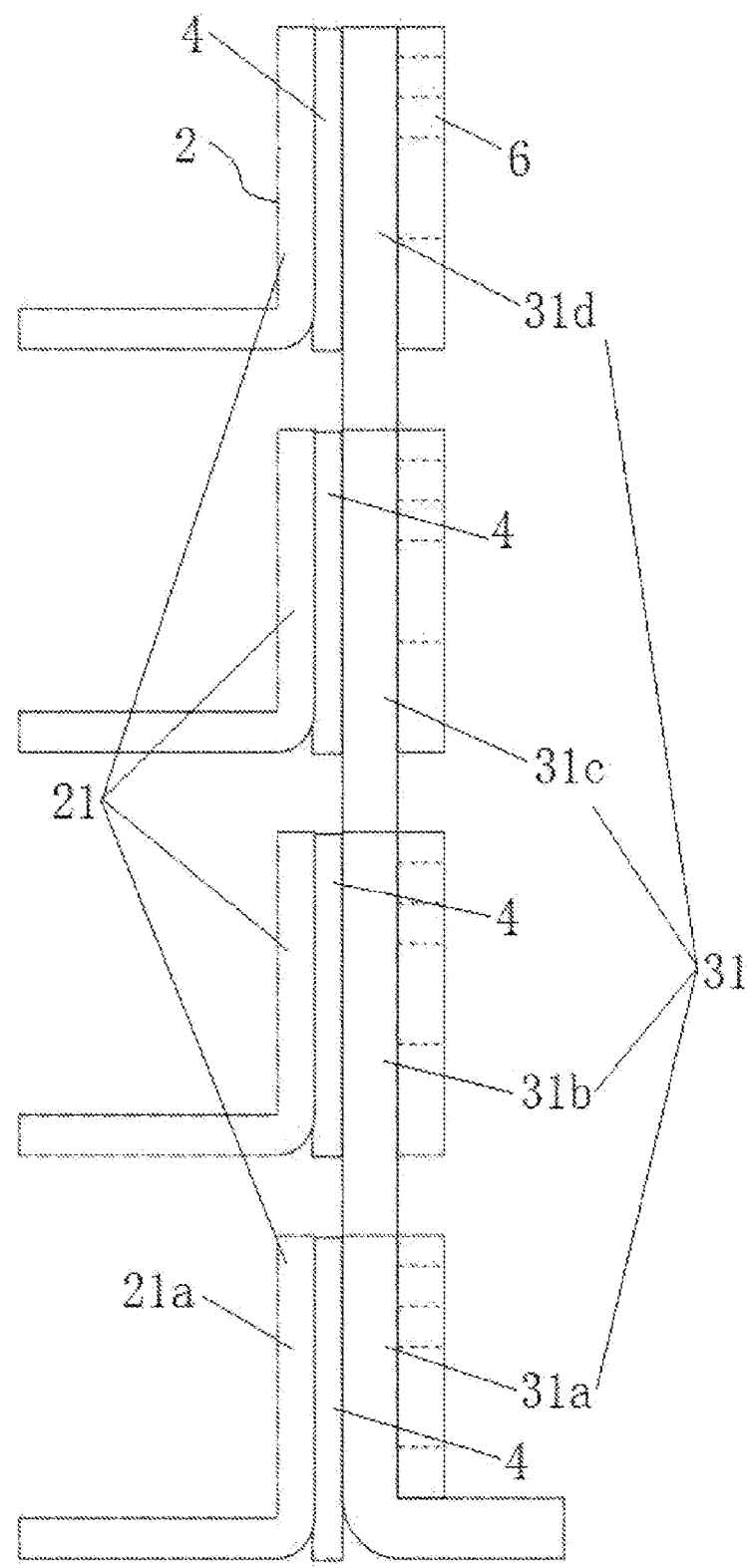
FIG. 4 is a left view of FIG. 3.
Figure 5:
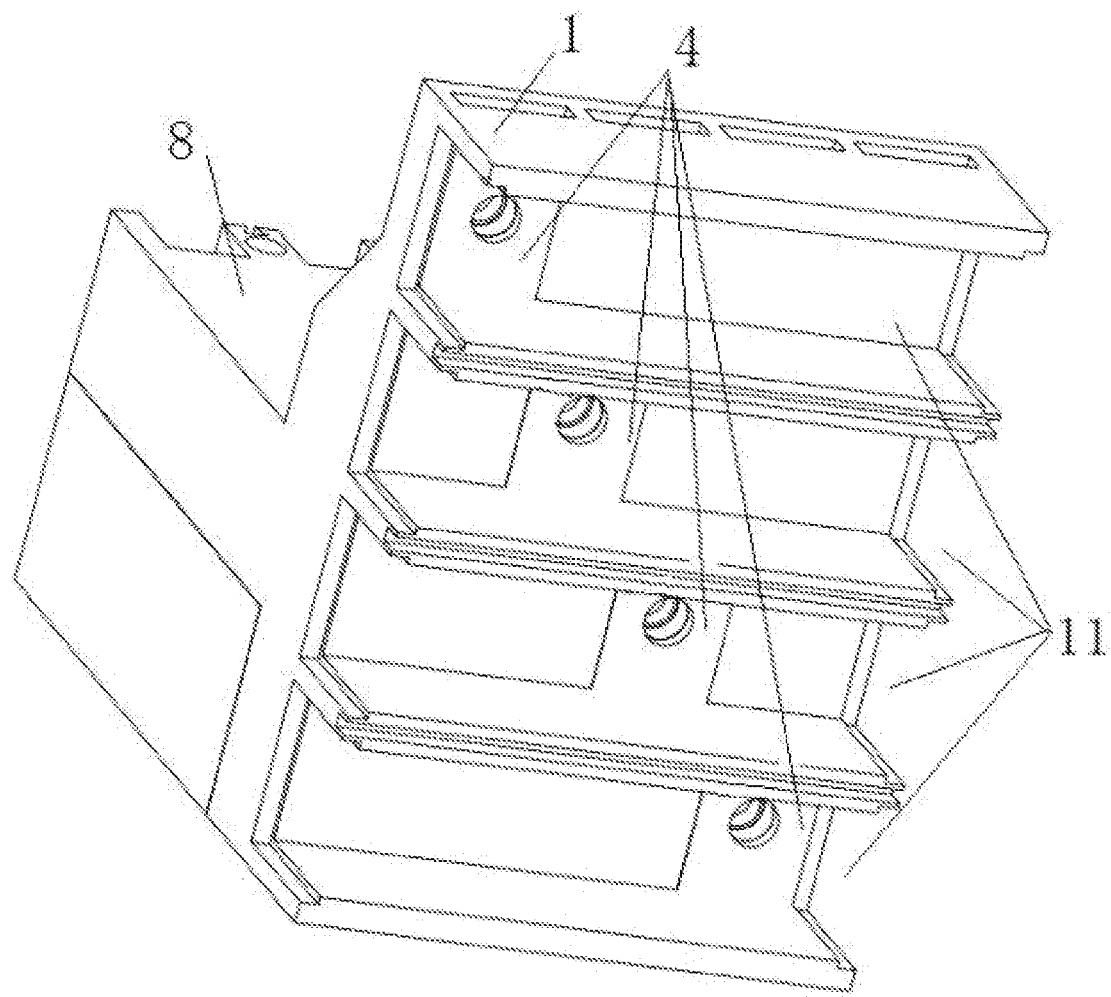
FIG. 5 is a three-dimensional diagram after wiring busbars are removed in FIG. 1.

There are four second conductive elements 4, as shown in FIG. 3 to FIG. 5, which are arranged between the corresponding first busbar parts 21 and first connecting plates 31. The second conductive elements 4 are suitable for staggering the corresponding wiring busbars 2 from the remaining non-corresponding first conductive elements 3. In the embodiment, the four second conductive elements 4 are all arranged on a second vertical plane. As shown in FIG. 3 and FIG. 4, the wiring busbar on a bottommost layer is taken as an example for description, since the four first connecting plates (31a, 31b, 31c, 31d) are all arranged on the third vertical plane, in order to avoid that the first busbar part 21a is in lap joint with other first connecting plates (31b, 31c, 31d) while in contact with the first connecting plate 31a, there are gaps for lap joint between the wiring busbars 2 and other first connecting plates (31b, 31c, 31d) by the arrangement of the second conductive elements 4 to avoid the condition of short circuit.

Figure 6:
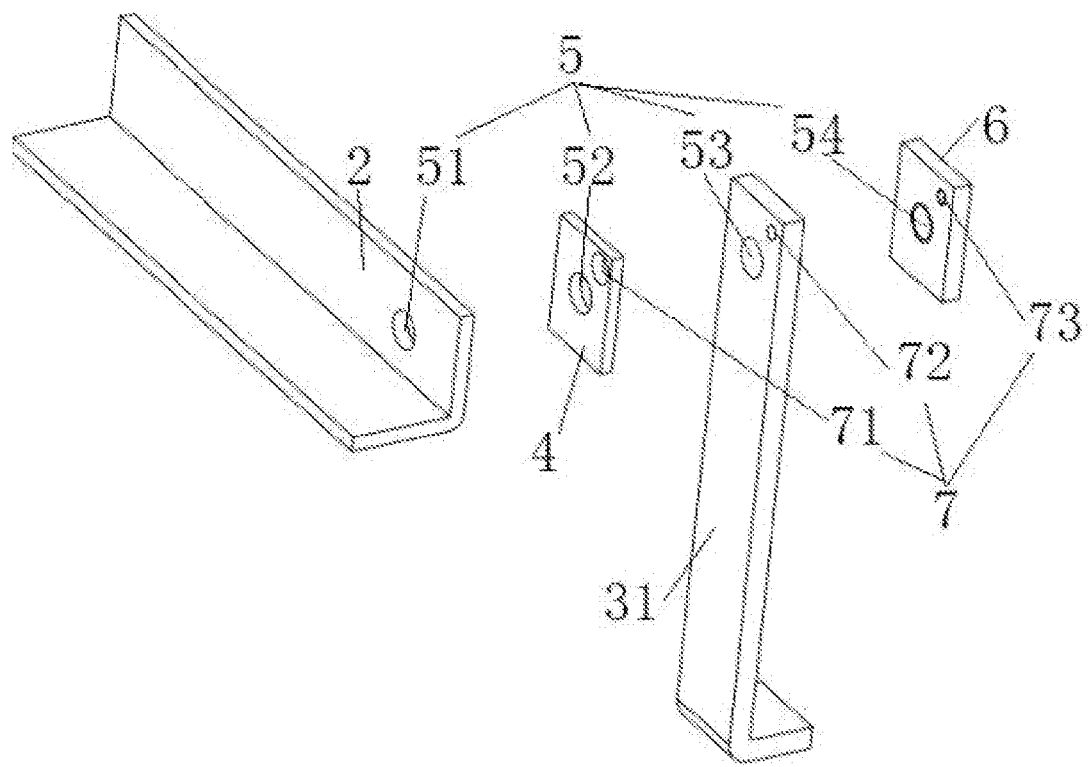
FIG. 6 is an exploded view of a wiring busbar, a second conductive element, a first conductive element and a fixing plate.

As shown in FIG. 6, the first fastening structure 5 includes: a first through hole 51 which is formed in the first busbar part 21; a second through hole 52 which is formed in the second conductive element 4 and is opposite to the first through hole 51; a third through hole 53 which is formed in the first connecting plate 31 and is opposite to the second through hole 52; a first threaded hole 54 which is formed in the fixing plate 6 and is opposite to the third through hole 53; and a first bolt which passes through the first through hole 51, the second through hole 52, the third through hole 53 and the first threaded hole 54 in sequence to fixedly connect the first busbar part 21, the second conductive element 4, the first connecting plate 31 and the fixing plate 6. It should be noted that a threaded hole can be directly machined in the first connecting plate 31, so as to eliminate the fixing plate 6.

The second conductive element 4, the first connecting plate 31 and the fixing plate 6 are fixedly connected through the second fastening structure 7. As shown in FIG. 6, the second fastening structure 7 includes a fourth through hole 71 which is formed in the second conductive element 4; a fifth through hole 72 which is formed in the first connecting plate 31 and is opposite to the fourth through hole 71; a second threaded hole 73 which is formed in the fixing plate 6 and is opposite to the fifth through hole 72; and a second bolt which passes through the fourth through hole 71 and the fifth through hole 72 in sequence to be in threaded connection with the second threaded hole 73. During assembly, the fixing plate 6 is first mounted in a mounting slot; the first connecting plate 31 of the first conductive element 3 is then inserted into the first passage; and the second conductive element 4 is finally inserted into the mounting hole. The second conductive element 4, the first connecting plate 31 and the fixing plate 6 are fixedly connected through the second fastening structure.

Figure 11:
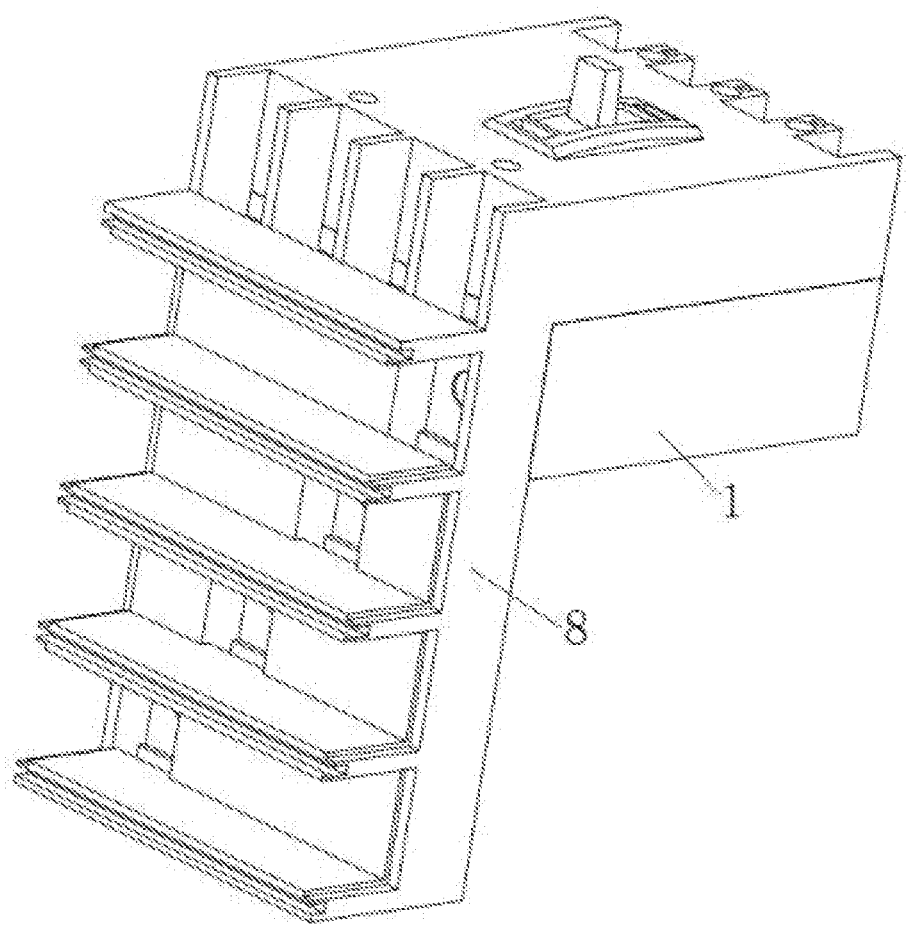
FIG. 11 is a three-dimensional diagram of a fourth implementation mode of a wiring device (four first connecting plates are all arranged downwards)

As a changeable implementation mode, as shown in FIG. 11, the four first connecting plates 31 are all arranged downwards.

Figure 12:
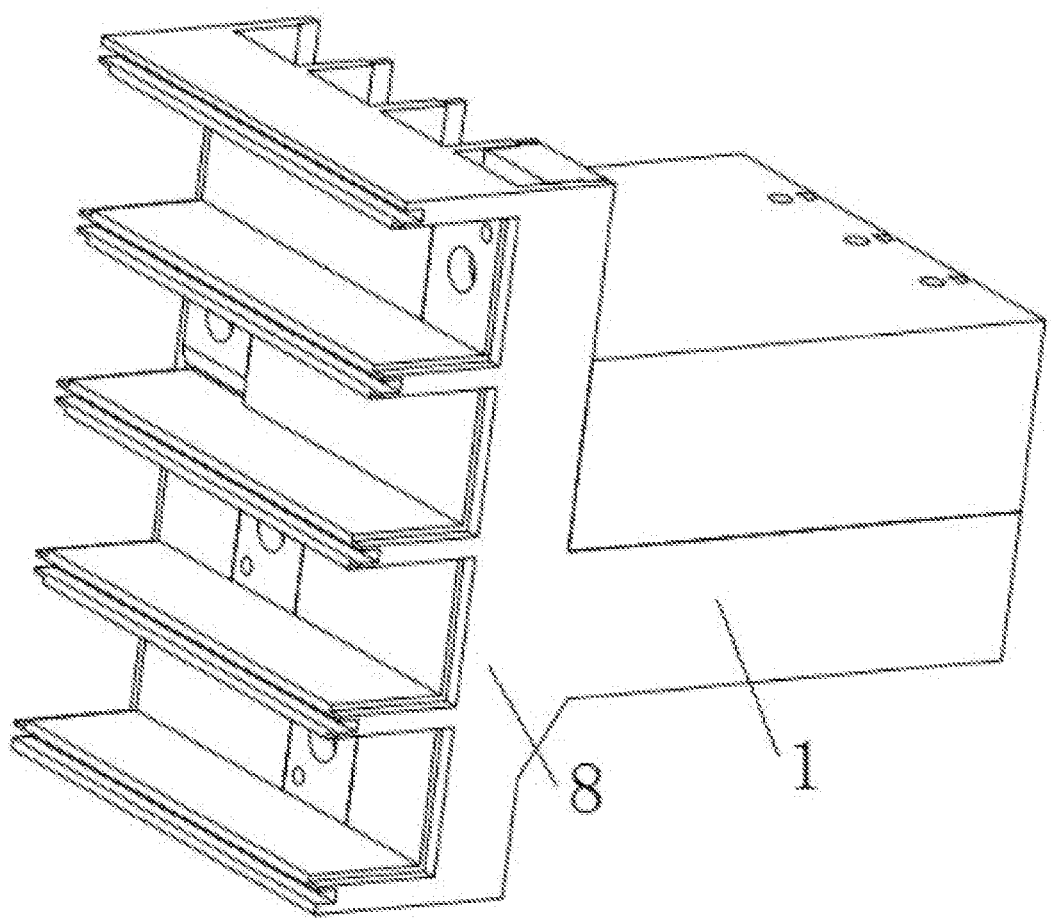
FIG. 12 is a three-dimensional diagram of a fifth implementation mode of a wiring device (a part of four first connecting plates are arranged downwards, and the other part of the four first connecting plates are arranged upwards)
Figure 13:
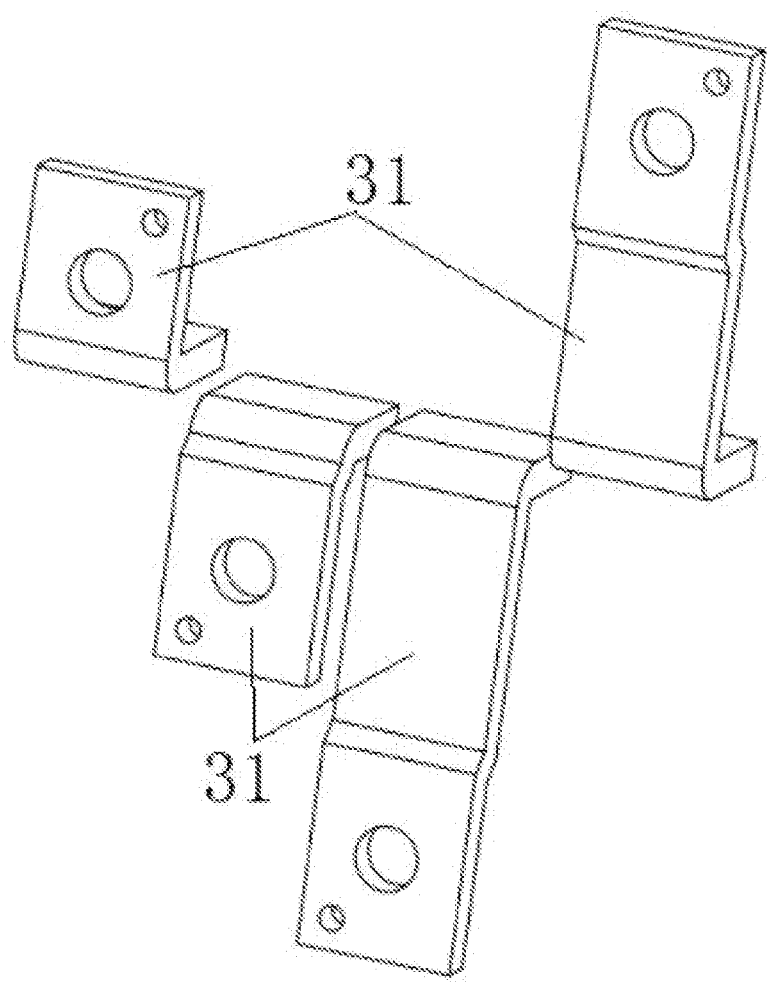
FIG. 13 is a three-dimensional diagram of four first conductive elements in FIG. 12.
Figure 14:
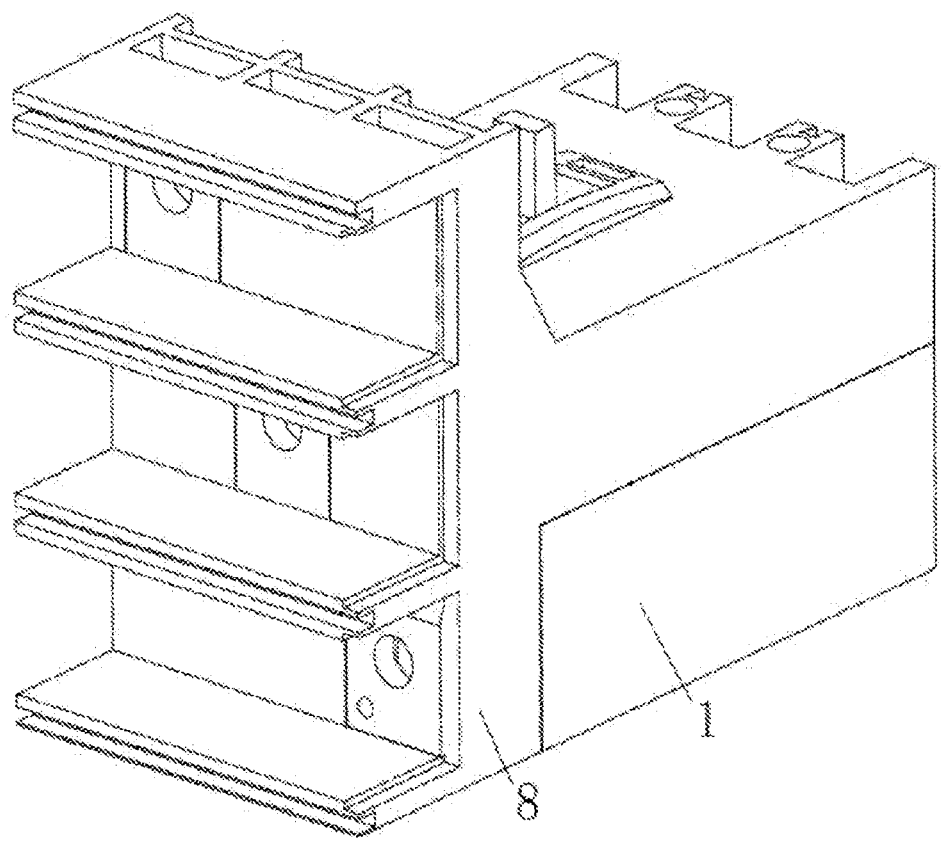
FIG. 14 is a three-dimensional diagram of a three-phase three-wire circuit breaker.
Figure 15:
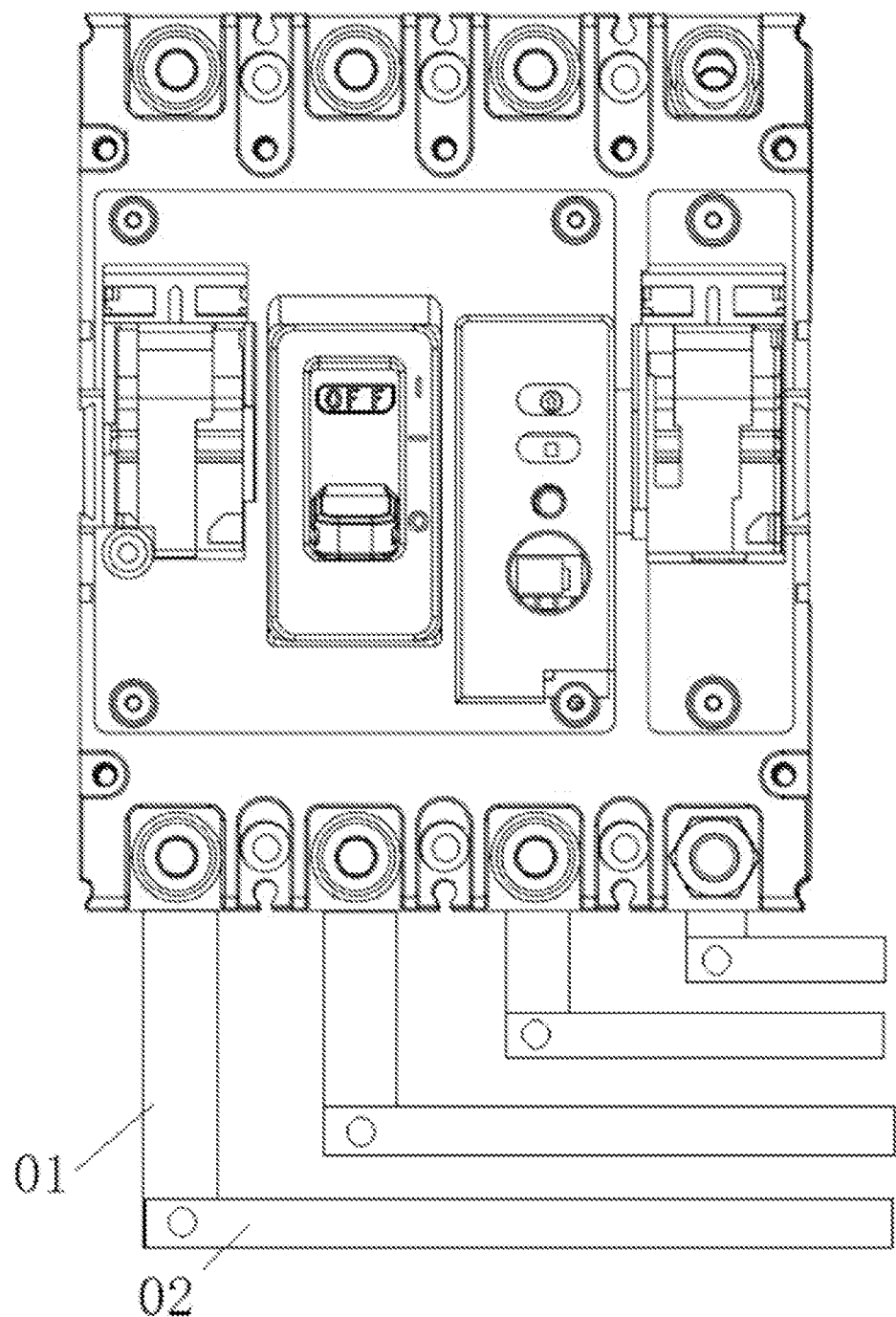
FIG. 15 is a top view of a circuit breaker using a copper bar for connection in the prior art.

As a changeable implementation mode, as shown in FIG. 12 and FIG. 13, two of the four first connecting plates 31 are arranged downwards, and the other two first connecting plates 31 are arranged upwards. In this way, the overall height of the four first busbar parts can be reduced, so that the copper consumption is low. On the one hand, the production cost is reduced, and on the other hand, more energy is saved, and low energy consumption is achieved.

Figure 7:
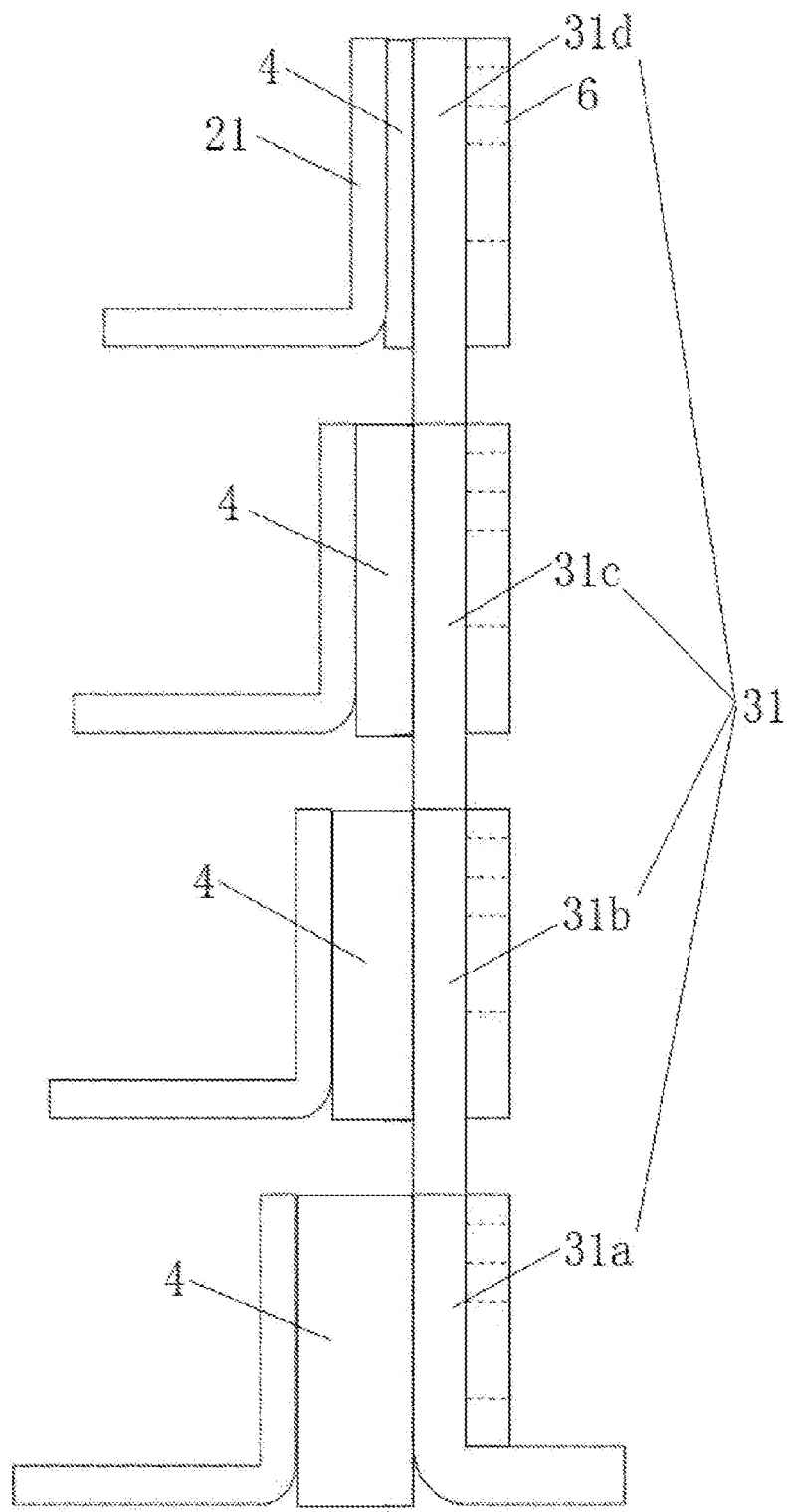
FIG. 7 is a schematic structural diagram according to a second implementation mode of a wiring device.

As a changeable implementation mode, as shown in FIG. 7, the four first connecting plates 31 are all arranged on a third vertical plane, and the lengths of the four second conductive elements 4 are gradually increased from top to bottom.

Figure 8:
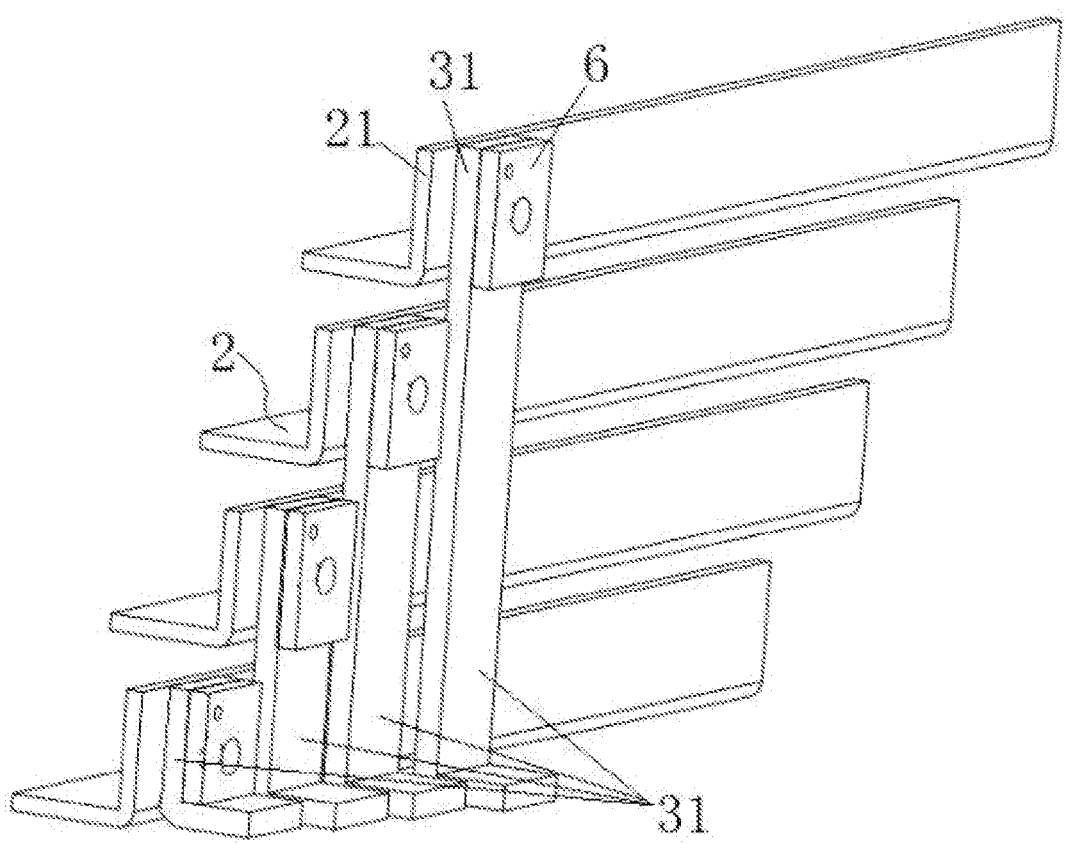
FIG. 8 is a schematic structural diagram according to a third implementation mode of a wiring device.
Figure 9:
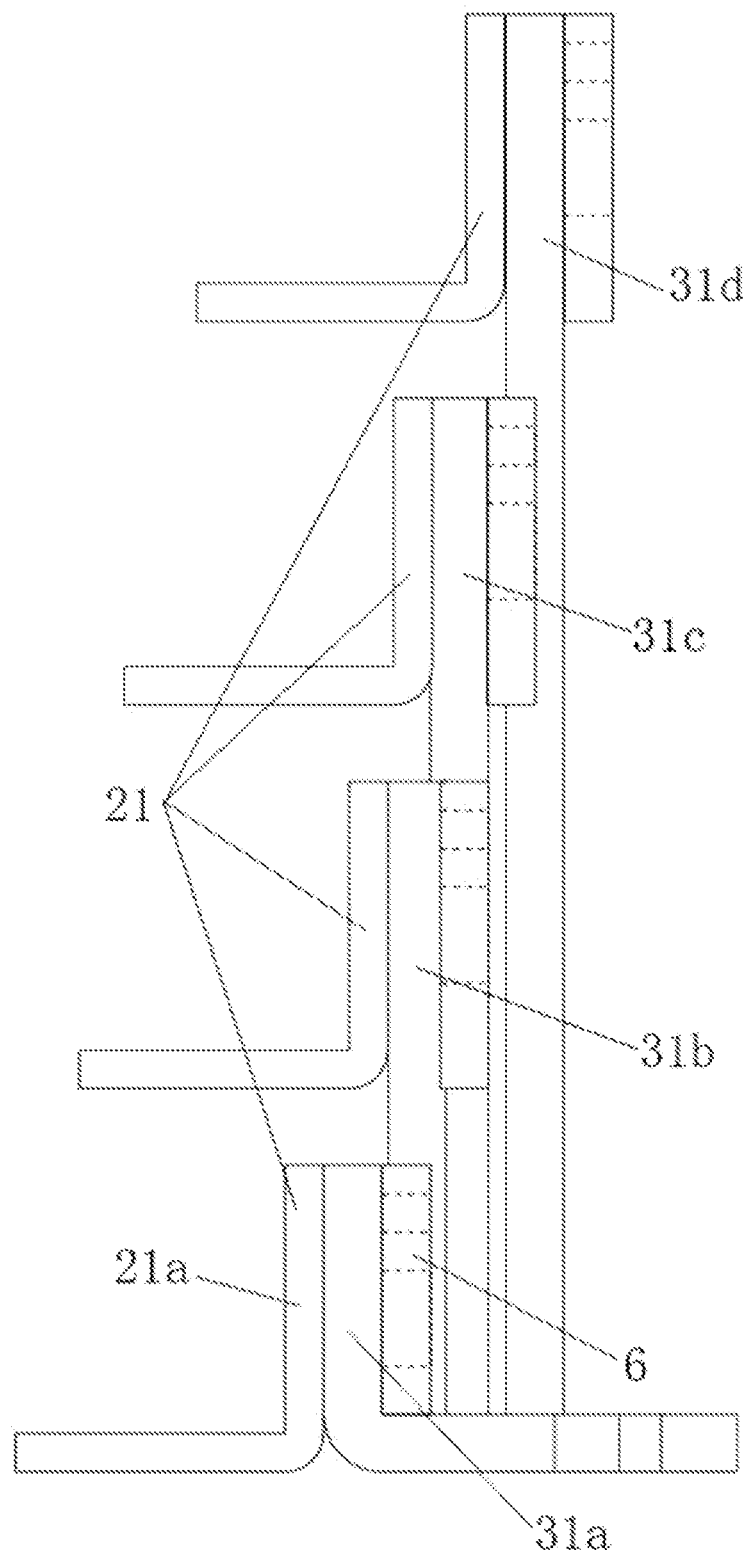
FIG. 9 is a left view of FIG. 8.

As a changeable implementation mode, as shown in FIG. 8 and FIG. 9, the plurality of wiring busbars 2 are arranged in a stepped manner, and each layer is only composed of the wiring busbar 2, the first conductive element 3 and the fixing plate 6.

Figure 10:
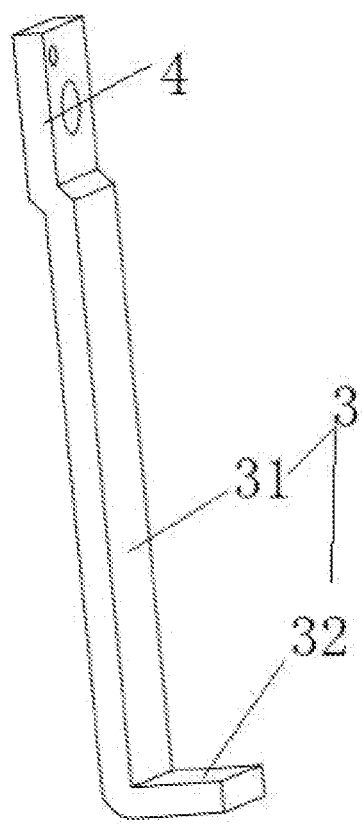
FIG. 10 is a three-dimensional diagram of a second conductive element and a first connecting plate which are formed in an integrally bent manner.

As a changeable implementation mode, as shown in FIG. 10, the second conductive element 4 is integrally formed on the first busbar part 21 or the first connecting plate 31, that is, the second conductive element 4 can be welded or riveted on the first busbar part 21. The second conductive element 4 and the first conductive element 3 can be directly formed by stamping the same plate, or the second conductive element 4 and the first conductive element 3 are connected in an integrally bent manner.

As a changeable implementation mode, the first fastening structure and the second fastening structure can be riveted or welded.

As a changeable implementation mode, the wire holder 1 and the circuit breaker body 8 are arranged separately.

As a changeable implementation mode, the wiring device can be simultaneously connected to 2, 3, 4 or more circuit breakers.

It should be noted that the wiring device of the present application can also be applied to a contactor, a fuse, and other power distribution apparatuses.

The wiring device for the circuit breaker provided by the present application includes the wire holder 1, the wiring busbars 2, the first conductive elements 3 and the first fastening structure 5; the wiring busbars 2 are provided with the first busbar parts 21 that are vertically arranged; the plurality of first conductive elements 3 are arranged on the wire holder 1 at intervals in the width direction; and the first conductive elements 3 are provided with the first connecting plates 31 that are vertically arranged. Since the plurality of first connecting plates 31 are vertically arranged in the width direction in a staggered manner, the plurality of first busbar parts 21 arranged in the height direction can be directly connected to the corresponding first connecting plates 31, which makes the structure simpler; the first busbar part 21 and the first connecting plate 31 of each layer are vertically arranged, such that the length of the wiring device for the circuit breaker is greatly reduced. Compared with the prior art that the busbar is fixed by a bracket, a clamping member, and a driving structure, the wiring device for the circuit breaker is more miniaturized; and in addition, due to the use of a small amount of copper, the wiring device for the circuit breaker not only has a smaller temperature rise, but also is lower in cost.

Obviously, the above-mentioned embodiments are merely examples taken for clear descriptions, but not intended to limit the implementation modes. Those of ordinary skill in the art can further make other changes or modifications in different forms on the basis of the above-mentioned descriptions. It is unnecessary and impossible to enumerate all implementation modes here. Obvious changes or modifications caused therefrom shall still fall within the protection scope of the present application.

What is claimed is:

1. A wiring device for a circuit breaker, comprising:
   a wire holder which is arranged on a circuit breaker body and is provided with a plurality of busbar slots distributed in a height direction;
   a plurality of wiring busbars which are correspondingly inserted into the plurality of busbar slots, and are provided with first busbar parts that are vertically arranged;
   a plurality of first conductive elements which are arranged on the wire holder at intervals in a width direction, and are provided with first connecting plates that are vertically arranged;
   a first fastening structure which is used for fixedly connecting the first busbar parts to the first connecting plates; and
   second conductive elements arranged between a corresponding first busbar parts and the first connecting plates, wherein the second conductive elements are suitable for staggering the wiring busbars corresponding to the second conductive elements from the first conductive elements not corresponding to the second conductive elements;
   wherein, the first conductive elements are provided with second connecting plates which are connected to a bottom of the first connecting plates in an integrally bent manner and are electrically connected to a control circuit inside the circuit breaker body; and the second connecting plates all extend towards the same side.

2. The wiring device for the circuit breaker according to claim 1, wherein the second connecting plates are all located on the same horizontal plane.

3. The wiring device for the circuit breaker according to claim 1, wherein the plurality of first busbar parts are all arranged on a first vertical plane; the second conductive elements are all arranged on a second vertical plane; and the first connecting plates are all arranged on a third vertical plane.

4. The wiring device for the circuit breaker according to claim 1, wherein the plurality of first connecting plates are all arranged upwards or downwards.

5. The wiring device for the circuit breaker according to claim 1, wherein a part of the first connecting plates is arranged downwards, and the other part of the first connecting plates is arranged upwards.

6. The wiring device for the circuit breaker according to claim 1, wherein the wiring busbars are provided with second busbar parts perpendicular to first busbar parts.

7. The wiring device for the circuit breaker according to claim 1, wherein the second conductive element are integrally formed on the first busbar parts or the first connecting plates.

8. The wiring device for the circuit breaker according to claim 1, wherein the first fastening structure is suitable for fixedly connecting the first busbar parts, the second conductive elements and the first connecting plates, and the first fastening structure comprises:
   a first through hole which is formed in the first busbar parts;
   a second through hole which is formed in the second conductive elements and is opposite to the first through hole;
   a third through hole which is formed in the first connecting plates and is opposite to the second through hole;
   a first threaded hole which is formed in a fixing plate and is opposite to the third through hole; and
   a first bolt which passes through the first through hole, the second through hole, the third through hole and the first threaded hole in sequence to fixedly connect the first busbar parts, the second conductive elements, the first connecting plates and the fixing plate.

9. The wiring device for the circuit breaker according to claim 8, wherein the wire holder is provided with a mounting hole used for mounting the second conductive elements, a first passage used for mounting the first connecting plates, and a mounting slot used for mounting the fixing plate in sequence in an insertion direction of the first bolt.

10. The wiring device for the circuit breaker according to claim 9, wherein the second conductive elements, the first connecting plates and the fixing plate are fixedly connected through a second fastening structure, and the second fastening structure comprises:
    a fourth through hole which is formed in the second conductive elements;
    a fifth through hole which is formed in the first connecting plates and is opposite to the fourth through hole;
    a second threaded hole which is formed in the fixing plate and is opposite to the fifth through hole; and
    a second bolt which passes through the fourth through hole and the fifth through hole in sequence to be in threaded connection with the second threaded hole.

11. The wiring device for the circuit breaker according to claim 1, wherein a passage for communicating an outside world to the second connecting plates is arranged between the wire holder and the circuit breaker body.

12. The wiring device for the circuit breaker according to claim 1, wherein the wire holder is integrally formed on the circuit breaker body.

13. The wiring device for the circuit breaker according to claim 1, wherein the wire holder and the circuit breaker body are arranged separately.

14. A circuit breaker, comprising a circuit breaker body, and a wiring device for the circuit breaker, the wiring device including:
    a wire holder arranged on the circuit breaker body and provided with a plurality of busbar slots distributed in a height direction;
    a plurality of wiring busbars correspondingly inserted into the plurality of busbar slots, and provided with first busbar parts that are vertically arranged;
    a plurality of first conductive elements arranged on the wire holder at intervals in a width direction, and provided with first connecting plates that are vertically arranged;
    a first fastening structure which is used for fixedly connecting the first busbar parts to the first connecting plates; and
    second conductive elements arranged between a corresponding first busbar parts and the first connecting plates, wherein the second conductive elements are suitable for staggering the wiring busbars corresponding to the second conductive elements from the first conductive elements not corresponding to the second conductive elements;
    wherein, the first conductive elements are provided with second connecting plates which are connected to a bottom of the first connecting plates in an integrally bent manner and is electrically connected to a control circuit inside the circuit breaker body; and the second connecting plates all extend towards the same side.

* * * * *